United States Patent
Nedelcu et al.

(10) Patent No.: US 11,665,552 B2
(45) Date of Patent: May 30, 2023

(54) ROAMING DEVICE ABLE TO PERFORM A REPEATER OR EXTENDER FUNCTION

(71) Applicant: SAGEMCOM BROADBAND SAS, Rueil Malmaison (FR)

(72) Inventors: Radu Nedelcu, Rueil Malmaison (FR); Jérôme Berger, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 17/777,831

(22) PCT Filed: Oct. 16, 2020

(86) PCT No.: PCT/EP2020/079203
§ 371 (c)(1),
(2) Date: May 18, 2022

(87) PCT Pub. No.: WO2021/104746
PCT Pub. Date: Jun. 3, 2021

(65) Prior Publication Data
US 2022/0408273 A1    Dec. 22, 2022

(30) Foreign Application Priority Data
Nov. 26, 2019   (FR) .................................. FR1913216

(51) Int. Cl.
*H04W 16/26*    (2009.01)
*H04B 1/401*    (2015.01)

(52) U.S. Cl.
CPC ............ *H04W 16/26* (2013.01); *H04B 1/401* (2013.01)

(58) Field of Classification Search
CPC ... H04W 24/08; H04W 52/225; H04W 24/02; H04W 48/16

(Continued)

(56) References Cited

U.S. PATENT DOCUMENTS

| 9,980,230 | B1 * | 5/2018 | Singh ....................... H04W 4/90 |
| 2010/0111053 | A1 * | 5/2010 | Avital ................... H04W 48/16 370/338 |

(Continued)

FOREIGN PATENT DOCUMENTS

| CA | 3008513 A1 * | 12/2018 | ......... G06Q 10/0833 |
| EP | 3489797 A1 | 5/2019 | |
| WO | WO-2010/075897 A1 | 7/2010 | |

*Primary Examiner* — David Q Nguyen
(74) *Attorney, Agent, or Firm* — Muncy, Geissler, Olds & Lowe, P.C.

(57) ABSTRACT

Roaming equipment including:
  communication means (10) comprising a client module (14) and a repeater module (15) or an extender module, the communication means being configurable in a first mode in which the client module is activated and the repeater module or the extender module is deactivated, such that the roaming equipment is arranged to perform a client function, and in a second mode in which the client module is activated and the repeater module or the extender module is also activated, such that the roaming equipment is arranged to perform both the client function and a repeater function or an extender function;
  configuration means (16, 43, 44) arranged to configure the communication means in the first mode while the roaming equipment is not receiving the external supply of power, and in a second mode while the roaming equipment is receiving the external supply of power via the power supply base.

10 Claims, 4 Drawing Sheets

(58) Field of Classification Search
USPC .......................... 370/328, 329, 330, 331, 315
See application file for complete search history.

(56) References Cited

U.S. PATENT DOCUMENTS

| | | | |
|---|---|---|---|
| 2013/0170363 A1* | 7/2013 | Millington | H04W 76/10 |
| | | | 370/252 |
| 2018/0199259 A1 | 7/2018 | Choi et al. | |
| 2019/0200283 A1* | 6/2019 | Graybeal | H04W 48/18 |

* cited by examiner

ROAMING DEVICE ABLE TO PERFORM A REPEATER OR EXTENDER FUNCTION

BACKGROUND OF THE INVENTION

In most homes, offices, and public spaces (shops, stations, airports, etc.) it is nowadays possible to connect equipment to the Internet via a wireless access point, e.g. a Wi-Fi access point.

The quality of the connection depends on a certain number of parameters, and in particular on the distance between the equipment and the wireless access point, on the thickness of walls, on interference from other electronic equipment, etc.

In order to improve the connection, use is made of repeaters or indeed of extenders.

The use of such additional equipment can make installation complicated and can be expensive, particularly when the wireless access point needs to have a coverage zone that is extensive.

OBJECT OF THE INVENTION

An object of the invention is to improve the connection and the extent of the coverage zone of a wireless access point, in a manner that is inexpensive.

SUMMARY OF THE INVENTION

In order to achieve this object, there is provided roaming equipment arranged to operate while being mounted or not mounted on a power supply base, and comprising:
 a battery for powering the roaming equipment while it is not receiving an external supply of power via the power supply base;
 communication means comprising a client module and a repeater module or an extender module, the communication means being configurable in a first mode in which the client module is activated and the repeater module or the extender module is deactivated, such that the roaming equipment is arranged to perform a client function of a wireless access point, and in a second mode in which the client module is activated and the repeater module or the extender module is also activated, such that the roaming equipment is arranged to perform both the client function and a repeater function or an extender function;
 configuration means arranged to configure the communication means in the first mode while the roaming equipment is not receiving the external supply of power, and in a second mode while the roaming equipment is receiving the external supply of power via the power supply base.

In addition to the client function, the roaming equipment of the invention can thus perform the repeater function are the extender function, thereby making it possible to improve the connection of a wireless access point two other pieces of client equipment and thus to extend the coverage zone of the wireless access point. This connection improvement is achieved without using additional equipment dedicated to improving the connection, and thus at lower cost.

It should also be observed that the repeater module and the extender module may potentially be software modules so that they can be implemented without requiring any major hardware modification to the design of pre-existing roaming equipment. The cost of implementing the functions is thus limited.

Since the repeater function and the extender function consume a relatively large amount of electrical energy, the roaming equipment is arranged to perform one of these functions only if it is mounted on a power supply base. The battery lifetime of the roaming equipment is thus not degraded by performing the repeater function or the extender function.

There is also provided roaming equipment as described above, wherein the communication means comprise a repeater module that is a Wi-Fi repeater module.

There is also provided roaming equipment as described above, wherein the communication means comprise an extender module that is a Wi-Fi extender module, the roaming equipment further comprising an Ethernet interface, the roaming equipment being arranged to be connected to the wireless access point via the Ethernet interface.

There is also provided roaming equipment as described above, wherein the communication means comprise a transceiver module having a first communication channel comprising a first amplifier of a first power and a second communication channel comprising a second amplifier of a second power greater than the first power, the first communication channel being deactivated while the communication means are configured in the second mode, the second communication channel being deactivated while the communication means are configured in the first mode.

There is also provided roaming equipment as described above, wherein the communication means comprise a transceiver module, at least one first antenna connected to at least one first output of the transceiver module and at least one second antenna, the configuration means comprising a first switch connected between a second output of the transceiver module and the second antenna, the first switch being open and the second antenna being disconnected from the second output of the transceiver module while the communication means are configured in the first mode, the first switch being closed and the second antenna being connected to the second output of the transceiver module while the communication means are configured in the second mode.

There is also provided roaming equipment as described above, wherein the communication means comprise a transceiver module and at least one first antenna connected to the transceiver module, the configuration means comprising a second switch connected between a third output of the transceiver module and an output of the roaming equipment, the second switch being open and the third output of the transceiver module being disconnected from the output of the roaming equipment while the communication means are configured in the first mode, the second switch being closed and the third output of the transceiver module being connected via the output of the roaming equipment to at least one third antenna mounted on the power supply base while the communication means are configured in the second mode.

There is also provided roaming equipment as described above, wherein the configuration means are arranged to cause the communication means to switch from the first mode to the second mode only during a stage while the client module is receiving signals or else during a stage while the client module is inactive.

There is also provided roaming equipment as described above, the roaming equipment being a smart speaker.

There is also provided a method of configuring roaming equipment as described above, the method comprising the steps of:

detecting whether the roaming equipment is or is not receiving the external supply of power via the power supply base;

if the roaming equipment is not receiving the external supply of power, configuring the communication means in the first mode;

if the roaming equipment is receiving the external supply of power, configuring the communication means in the second mode.

There is also provided a computer program including instructions for causing the roaming equipment as described above to execute the steps of the above configuration method.

There is also provided a computer-readable storage medium storing the computer program as described above.

The invention can be better understood in the light of the following description of particular, nonlimiting embodiments of the invention.

BRIEF DESCRIPTION OF THE DRAWINGS

Reference is made to the accompanying drawings, in which.

DETAILED DESCRIPTION OF THE INVENTION

Figure 1:
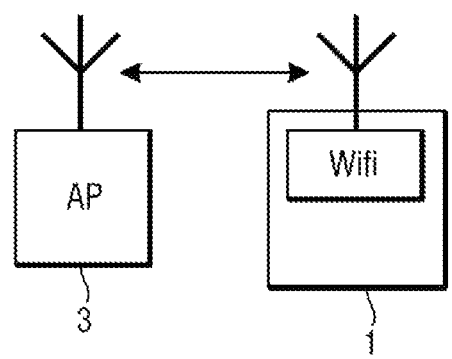
FIG. 1 shows a Wi-Fi access point and a smartspeaker in a first embodiment of the invention, the communication means of the smartspeaker being configured in a first mode.
Figure 2:
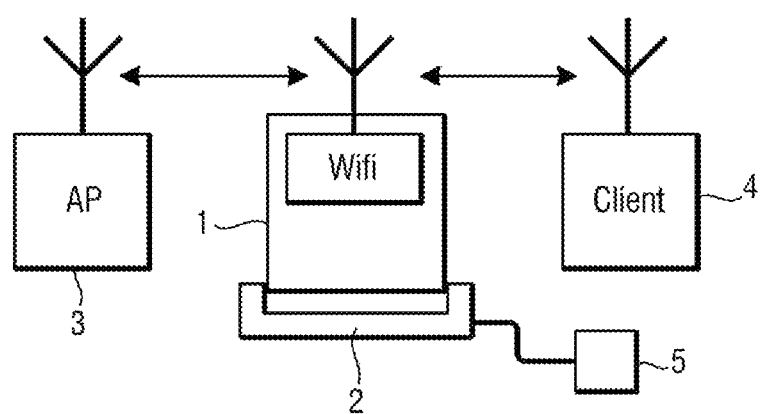
FIG. 2 shows the Wi-Fi access point, the smartspeaker mounted on a power supply base, and a piece of client equipment, the communication means of the smartspeaker being configured in a second mode.

With reference to FIGS. 1 and 2, the roaming equipment of the invention in this example is a smartspeaker in a first embodiment of the invention.

The smartspeaker 1 can operate whether or not it is mounted on a power supply base 2.

When the smartspeaker 1 is not mounted on the power supply base 2, as shown in FIG. 1, the smartspeaker 1 performs a client function (naturally in addition to its main function as an audio loudspeaker) and it can become connected to a Wi-Fi access point 3 via a Wi-Fi connection.

When the smartspeaker 1 is mounted on the power supply base 2, as shown in FIG. 2, the smartspeaker 1 performs not only its client function, but also a Wi-Fi repeater function. Another piece of client equipment 4 can thus become connected to the Wi-Fi access point 3 via the smartspeaker 1. The power supply base 2 is normally connected to mains 5.

In this example, the term "repeater function" is used to cover a function consists in receiving a Wi-Fi signal, in amplifying and possibly processing the Wi-Fi signal, and in re-broadcasting it without modifying its content.

The smartspeaker 1 includes firstly power supply means comprising a battery and an external power supply interface. The power supply means generate a general power supply voltage Vcc that powers the components of the smartspeaker 1.

When the smartspeaker 1 is not mounted on the power supply base 2, or indeed when the smartspeaker 1 is mounted on the power supply base 2 but the base is not connected to mains 5, then the smartspeaker 1 is powered solely by the battery.

When the smartspeaker 1 is mounted on the power supply base 2 and the base is connected to the mains 5, the external power supply interface of the power supply means of the smartspeaker 1 receives an external supply of power (coming from the mains 5) via the power supply base 2. The smartspeaker 1 is then powered, in full or at least in part, by the external power supply.

In this example, the power supply base 2 includes a first winding forming a primary antenna.

The external power supply interface of the smartspeaker 1 has a second winding forming a secondary antenna.

When the smartspeaker 1 is mounted on the power supply base 2 and the base is connected to mains 5, a magnetic field is generated by the power supply base 2 via the primary antenna. An induced current is then generated at an induced voltage in the secondary antenna of the smartspeaker 1. The induced current and the induced voltage form of the above-mentioned external power supply.

The smartspeaker 1 also has communication means and configuration means.

The configuration means are arranged to configure the communication means in a first mode while the smartspeaker 1 is not receiving the external supply of power, and in a second mode while the smartspeaker 1 is receiving the external supply of power via the power supply base 2.

Figure 3:
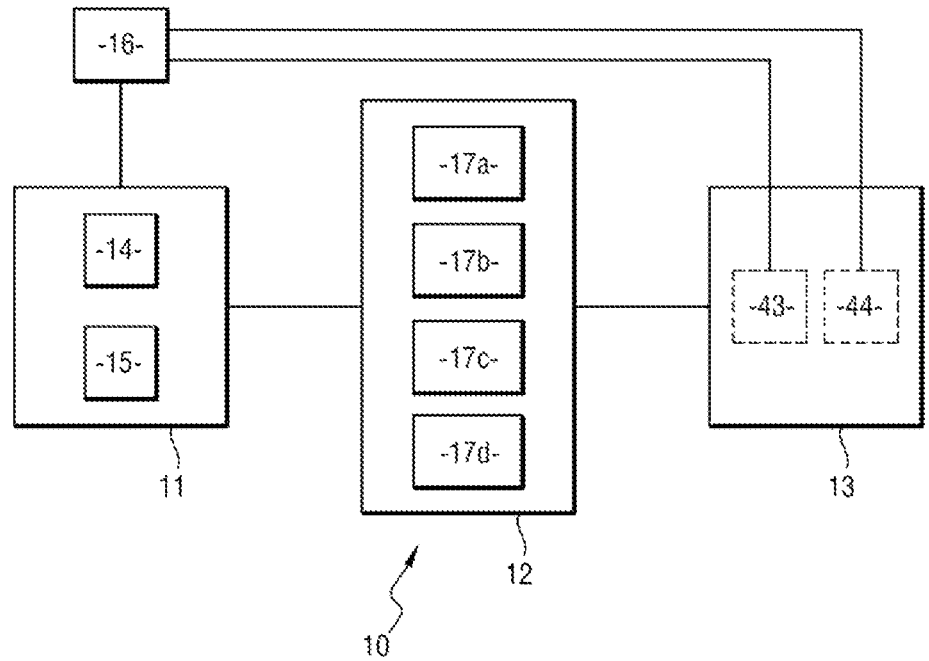
FIG. 3 is a diagram showing the communication means.

With reference to FIG. 3, the communication means 10 comprise, from upstream to downstream, a communication unit 11, a transceiver module 12, and a set of antennas 13.

The communication unit 11 comprises a client module 14 and a repeater module 15. The repeater module 15 implements the 802.11s standard.

The client module 14 and the repeater module 15 are software modules.

The configuration means comprise firstly a processor component 16 adapted to execute instructions of a program in order to perform the steps of the configuration method as described below. By way of example, the processor component 16 is a microcontroller, a processor, or indeed a programmable logic circuit such as a field programmable gate array (FPGA) or an application specific integrated circuit (ASIC).

While the smartspeaker 1 is not receiving the external supply of power, the processor component 16 activates the client module 14, but deactivates the repeater module 15. While the smartspeaker 1 is receiving the external supply of power via the power supply base 2, the processor component 16 activates both the client module 14 and also the repeater module 15. The client module 14 is thus activated continuously. None of its transmission and reception tasks are interrupted. Activation of the repeater module 15 activates a data gateway between the repeater module 15 and the other piece of client equipment 4.

Thus, while the communication means 10 are configured in the first mode, the client module 14 is activated and the repeater module 15 is deactivated, and while the communication means 10 are configured in the second mode, both the client module 14 and the repeater module 15 are activated.

The transceiver module 12 is connected to the outputs of the client module 14 and of the repeater module 15 of the communication unit 11.

The transceiver module 12 is a hardware module comprising electronic components.

Figure 4:
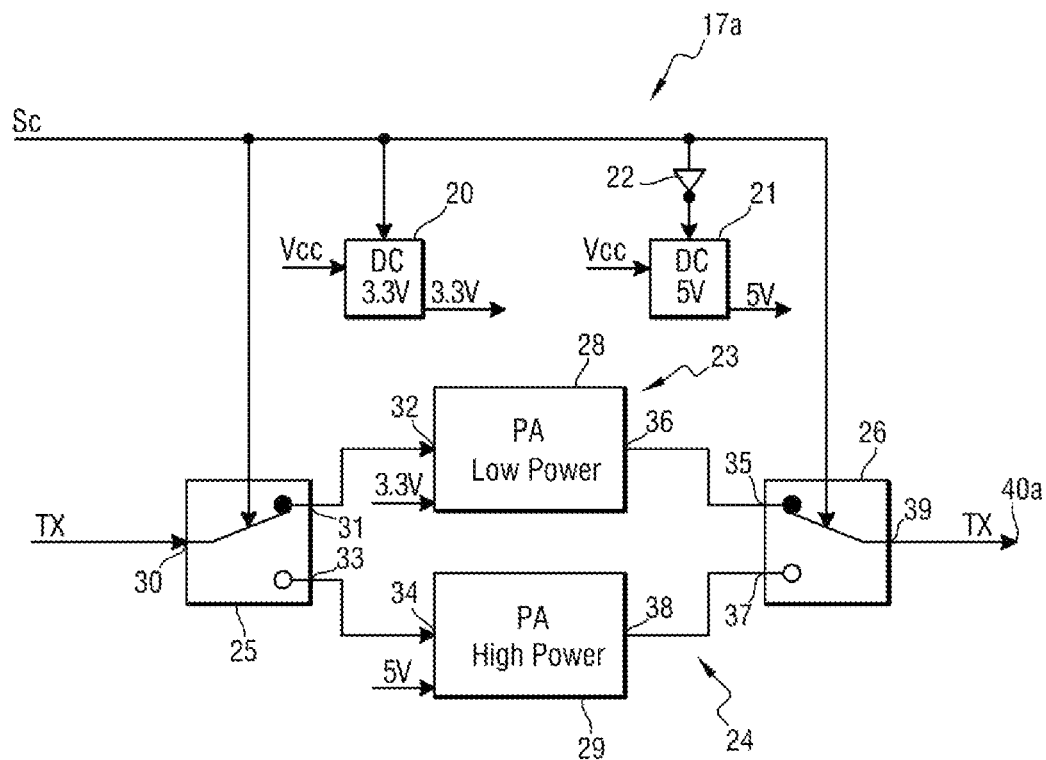
FIG. 4 shows a first communication channel and a second communication channel of the communication means.

In this example, the transceiver module 12 comprises a first transmit channel 17a, a second transmit channel 17b, a third transmit channel 17c, and a fourth transmit channel 17d. Only the first transmit channel 17a is shown in FIG. 4.

The first transmit channel 17a has a first power supply component 20, a second power supply component 21, a NOT gate 22, a first communication channel 23, a second communication channel 24, a first switch 25, and a second switch 26. The first switch 25 and the second switch 26 are double-throw switches.

The first power supply component 20 generates a first direct current (DC) power supply voltage at 3.3 volts (V) and is itself powered by the general power supply voltage Vcc. The second power supply component 21 generates a second DC power supply voltage at 5 V and is itself powered by the general power supply voltage Vcc.

The first communication channel 23 comprises a first power amplifier 28 powered by the first power supply voltage. The first amplifier 28 produces a first power. The second communication channel 24 comprises a second power amplifier 29 powered by the second power supply voltage. The second amplifier 29 produces a second power (maximum 1 watt (W)) that is greater than the first power (maximum 100 milliwatts (mW)). The first amplifier 28 is a "low-power" amplifier and the second amplifier 29 is a "high-power" amplifier.

The first switch 25 presents an input 30 connected to an output of the communication unit 11, a first output 31 connected to an input 32 of the first amplifier 28, and a second output 33 connected to an input 34 of the second amplifier 29. The second switch 26 presents a first input 35 connected to an output 36 of the first amplifier 28, a second input 37 connected to an output 38 of the second amplifier 29, and an output 39 of that is connected to a first output 40a of the first transmit channel 17a.

When the processor component 16 configures the communication means 10 in the first mode, it produces a control signal Sc in the high state. The control signal Sc in the high state controls the first switch 25 so that the output of the communication unit 11 is connected to the first output 31 of the first switch 25, and thus to the input 32 of the first amplifier 28. The control signal Sc in the high state activates the first power supply component 20 that generates the first power supply voltage so as to power and activate the first amplifier 28. A signal in the low state is produced at the output from the NOT gate 22 and deactivates the second power supply component 21 and thus the second amplifier 29 (and thus deactivates the second communication channel 24). The control signal Sc in the high state controls the second switch 26 in such a manner that the first input 35 of the second switch 26 and thus the output 36 of the first amplifier 28 are connected to the output 39 of the second switch 26 and thus to the first output 40a of the first transmit channel 17a. The first output 40a is also a first output of the transceiver module 12.

Thus, transmit (TX) Wi-Fi signals produced by the communication unit 11 are broadcast via the first communication channel 23.

In contrast, when the processor component 16 configures the communication means 10 in the second mode, it produces a control signal Sc in the low state. The control signal Sc in the low state controls the first switch 25 so that the output of the communication unit 11 is connected to the second output 33 of the first switch 25, and thus to the input 34 of the second amplifier 29. The control signal Sc in the low state deactivates the first power supply component 20 and thus deactivates the first amplifier 28 (and thus deactivates the first communication channel 23). A signal in the high state is produced at the output from the NOT gate 22 and activates the second power supply component 21 and thus the second amplifier 29. The control signal Sc in the low state controls the second switch 26 in such a manner that the second input 37 of the second switch 26 and thus the output 38 of the second amplifier 29 are connected to the output 39 of the second switch 26 and thus to the first output 40a of the first transmit channel 17a.

Thus, TX Wi-Fi signals produced by the communication unit 11 are broadcast via the second communication channel 24.

The second transmit channel 17b is similar to the first transmit channel 17a and has a first output 40b (which is also a first output of the transceiver module 12).

The third transmit channel 17c has only the second communication channel and includes a second output 40c (which is also a second output of the transceiver module 12).

The fourth transmit channel 17d has only the second communication channel and includes a third output 40d (which is also a third output of the transceiver module 12).

Figure 5:
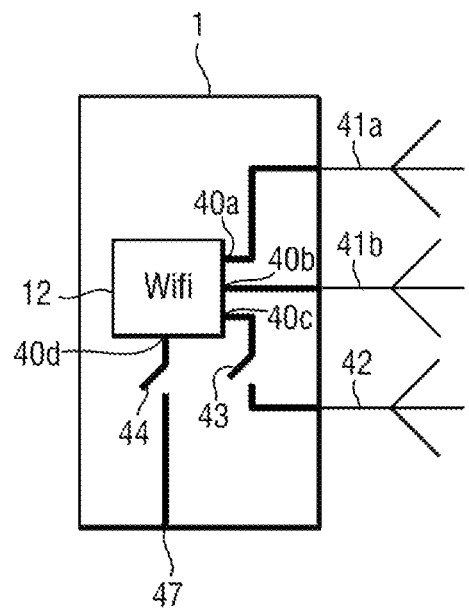
FIG. 5 shows the smartspeaker having two first antennas and one second antenna.
Figure 6:
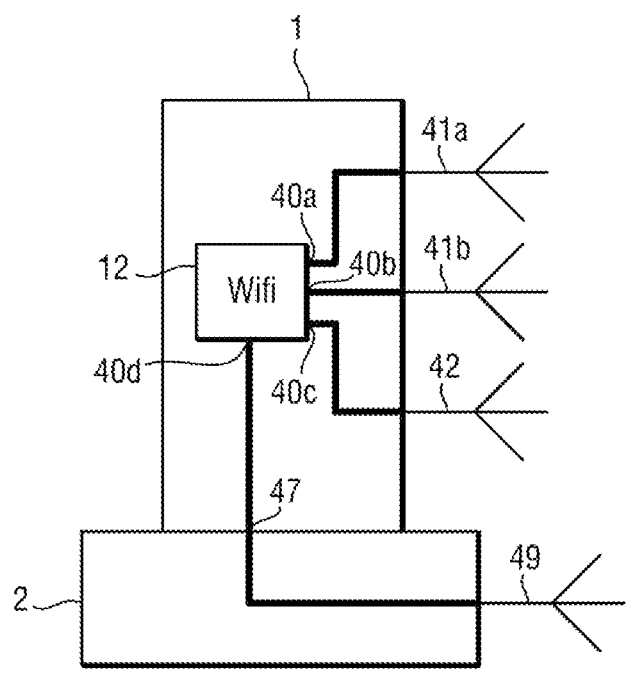
FIG. 6 shows the FIG. 5 smartspeaker mounted on a power supply base having a third antenna.

With reference to FIGS. 5 and 6, the set of antennas 13 comprises at least one first antenna, specifically two first antennas 41a and 41b, and at least one second antenna, specifically one second antenna 42.

In addition to the processor component 16, the configuration means also comprise a first switch 43 and a second switch 44.

The first switch 43 is connected between the second output 40c of the third transmit channel 17c of the transceiver module 12 and the second antenna 42.

The second switch 44 is connected between the third output 40d of the fourth transmit channel 17d and an output 47 of the smartspeaker 1.

The first antenna 41a and the first antenna 41b are permanently connected respectively to the first output 40a of the first transmit channel 17a and to the first output 40b of the second transmit channel 17b of the transceiver module 12, while the second antenna 42 is connected to the second output 40c of the third transmit channel 17c via the first switch 43.

While the smartspeaker 1 is mounted on the power supply base 2, the output 47 of the smartspeaker 1 is connected to an input of the power supply base 2 that is itself connected to at least one third antenna, specifically one third antenna 49 mounted on the power supply base 2.

The processor component 16 controls the first switch 43 and the second switch 44 in such a manner that when the communication means 10 are configured in the first mode, both the first switch 43 and the second switch 44 are open. The second antenna 42 and the third antenna 49 are thus not connected to the transceiver module 12. The power supply for the power amplifiers of the third transmit channel 17c and of the fourth transmit channel 17d is switched off.

In contrast, when the communication means 10 are configured in the second mode, both the first switch 43 and the second switch 44 are closed. The second output 40c of the transceiver module 12 is connected to the second antenna 42, and the third output 40d of the transceiver module 12 is connected to the third antenna 49.

Thus, while the smartspeaker 1 is powered solely by the battery, only the two first antennas 41a and 41b are used. These two first antennas 41a and 41b serve to provide sufficient bandwidth for the Wi-Fi client function on its own. This serves to reduce the electricity consumption of the smartspeaker 1. The smartspeaker 1 does not perform the repeater function.

In contrast, while the smartspeaker 1 is powered via the power supply base 2, both first antennas 41a and 41b are used together with the second antenna 42 and the third antenna 49. This serves to maximize the performance of the system, which is then capable of performing the repeater function. Specifically, the repeater function requires a high data rate and thus a greater number of antennas. It should be observed that the third antenna 49 (there could be several of them) is placed on the power supply base 2 in such a manner as to improve the diversity of the radiation generated by the set of antennas.

It should be observed that the processor component 16 of the configuration means causes the communication means 10 to switch from the first mode to the second mode only during a stage while the client module 14 is receiving Wi-Fi signals or else during a stage while the client module 14 is inactive. This serves to avoid losing any data packets.

Figure 7:
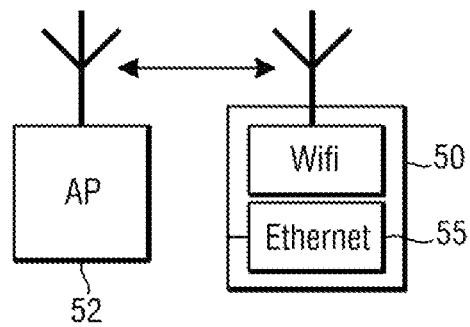
FIG. 7 shows a Wi-Fi access point and a smartspeaker in a second embodiment of the invention, the communication means of the smartspeaker being configured in a first mode.
Figure 8:
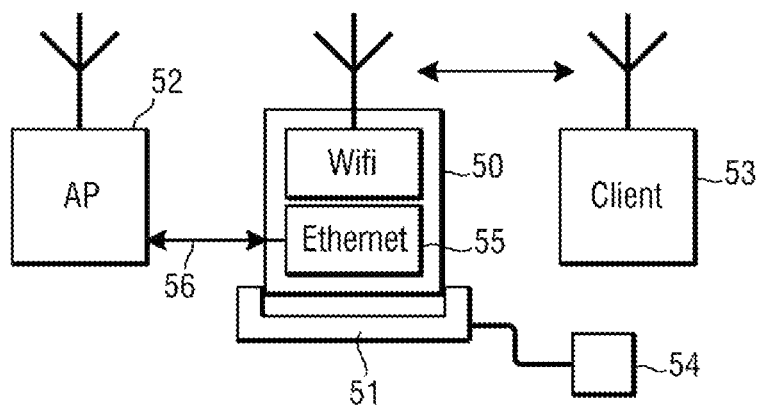
FIG. 8 shows the Wi-Fi access point, the smartspeaker mounted on a power supply base, and a piece of client equipment, the communication means of the smartspeaker being configured in a second mode.

With reference to FIGS. 7 and 8, there follows a description of a smartspeaker 50 in a second embodiment of the invention.

While the smartspeaker 50 is not mounted on the power supply base 51, as shown in FIG. 7, the smartspeaker 50 performs a client function and it can become connected to a Wi-Fi access point 52 via a Wi-Fi connection.

While the smartspeaker 50 is mounted on the power supply base 51, as shown in FIG. 8, the smartspeaker 50 performs not only its client function, but also a Wi-Fi extender function. Another piece of client equipment 53 can thus become connected to the Wi-Fi access point 52 via the smartspeaker 50. The power supply base 51 is normally connected to mains 54.

In this example, the term "extender function" designates a function that consists in receiving a first signal using a first protocol, optionally a wired protocol, in amplifying and optionally processing the first signal in order to obtain a second signal in a second protocol for a wireless network, and in broadcasting the second signal.

In this example, the first signal is an Ethernet signal and the second signal is a Wi-Fi signal.

The smartspeaker 50 differs from the smartspeaker 1 firstly in that the communication unit of the smartspeaker 50 has an extender module and not a repeater module. The extender module is a software module.

The smartspeaker 50 also differs from the smartspeaker 1 in that it has a wired network interface, specifically an Ethernet interface 55. The smartspeaker 50 is connected to the Wi-Fi access point 52 via its Ethernet interface 55 and via the power supply base 51, which is in turn connected to the Wi-Fi access point 52 via an Ethernet cable 56.

In this example, the smartspeaker 50 also does not have a secondary antenna, and the power supply base 51 does not have a primary antenna for delivering the external power supply.

The power supply base 51 includes a first connector. The smartspeaker 50 includes a second connector that is complementary to the first connector.

The external power supply interface of the smartspeaker 50 is connected to two power supply pins of the second connector, and the Ethernet interface is connected to six signal pins of the second connector.

Neither the external supply of power supply nor the exchanges of signals between the Wi-Fi access point 52 and the smartspeaker 50 take place using "wireless" means, as with the smartspeaker 1, but rather they take place via the first connector and the second connector (and the Ethernet cable 56 for signals).

Naturally, the invention is not limited to the embodiments described, but covers any variant coming within the ambit of the invention as defined by the claims.

Firstly, it should be observed that it is not essential to make use of amplifiers of different powers in client mode and in repeater or extender mode. It is possible to have a single power amplifier powered with 5 V while the smartspeaker is mounted on the power supply base, and with 3.3 V while the smartspeaker is battery powered. This solution is simpler and less expensive.

Nevertheless, in order to obtain maximum energy efficiency while the smartspeaker is battery powered, it is preferable to use respective power amplifiers that are dedicated to each mode. Specifically, for given output power, the low-power amplifier is more efficient than the high-power amplifier.

The above-described electrical interfaces between the power supply base and the smartspeaker are nonlimiting examples. In the first embodiment, and by way of example, the external power supply could be delivered via a first connector of the power supply base and a second connector of the smartspeaker. In the second embodiment, and by way of example, the signals could be exchanged by powerline carriers conveyed via the two power supply pins of the first connector and of the second connector. The six signal pins would then not be necessary, thereby greatly simplifying the first and second connectors.

It should be observed that there is no need to activate the additional antennas while the smartspeaker is connected to mains.

The above description relates to a smartspeaker in a first embodiment that includes a repeater module, and a smartspeaker in a second embodiment that includes an extender module. Naturally, the smartspeaker of the invention could have both a repeater module and an extender module, both of which would be deactivated when the communication means are configured in the first mode.

The roaming equipment is not necessarily a smartspeaker, but it could be some other piece of equipment, e.g. a smartwatch, a smartphone, a tablet, a laptop computer, etc.

The invention claimed is:

1. Roaming equipment arranged to operate while being mounted or not mounted on a power supply base, and comprising:
   a battery for powering the roaming equipment while it is not receiving an external supply of power via the power supply base;
   communication means comprising a client module and a repeater module or an extender module, the communication means being configurable in a first mode in which the client module is activated and the repeater module or the extender module is deactivated, such that the roaming equipment is arranged to perform a client function of a wireless access point, and in a second mode in which the client module is activated and the repeater module or the extender module is also activated, such that the roaming equipment is arranged to perform both the client function and a repeater function or an extender function;
   configuration means arranged to configure the communication means in the first mode while the roaming equipment is not receiving the external supply of power, and in a second mode while the roaming equipment is receiving the external supply of power via the power supply base.

2. The roaming equipment according to claim 1, wherein the communication means comprise a repeater module that is a Wi-Fi repeater module.

3. The roaming equipment according to claim 1, wherein the communication means comprise an extender module that is a Wi-Fi extender module, the roaming equipment further comprising an Ethernet interface, the roaming equipment being arranged to be connected to the wireless access point via the Ethernet interface.

4. The roaming equipment according to claim 1, wherein the communication means comprise a transceiver module having a first communication channel comprising a first amplifier having a first power and a second communication channel comprising a second amplifier having a second power greater than the first power, the first communication channel being deactivated while the communication means are configured in the second mode, the second communication channel being deactivated while the communication means are configured in the first mode.

5. The roaming equipment according to claim 1, wherein the communication means comprise a transceiver module, at least one first antenna connected to at least one first output of the transceiver module and at least one second antenna, the configuration means comprising a first switch connected between a second output of the transceiver module and the second antenna, the first switch being open and the second antenna being disconnected from the second output of the transceiver module while the communication means are configured in the first mode, the first switch being closed and the second antenna being connected to the second output of the transceiver module while the communication means are configured in the second mode.

6. The roaming equipment according to claim 1, wherein the communication means comprise a transceiver module and at least one first antenna connected to the transceiver module, the configuration means comprising a second switch connected between a third output of the transceiver module and an output of the roaming equipment, the second switch being open and the third output of the transceiver module being disconnected from the output of the roaming equipment while the communication means are configured in the first mode, the second switch being closed and the third output of the transceiver module being connected via the output of the roaming equipment to at least one third antenna mounted on the power supply base while the communication means are configured in the second mode.

7. The roaming equipment according to claim 1, wherein the configuration means are arranged to cause the communication means to switch from the first mode to the second mode only during a stage while the client module is receiving signals or else during a stage while the client module is inactive.

8. The roaming equipment according to claim 1, the roaming equipment being a smartspeaker.

9. A method of configuring roaming equipment according to claim 1, the method comprising the steps of:
  detecting whether the roaming equipment is or is not receiving the external supply of power via the power supply base;
  if the roaming equipment is not receiving the external supply of power, configuring the communication means in the first mode;
  if the roaming equipment is receiving the external supply of power, configuring the communication means in the second mode.

10. A computer-readable storage medium storing a computer program including instructions for causing the roaming equipment according to claim 1 to execute a configuration method comprising the steps of:
  detecting whether the roaming equipment is or is not receiving the external supply of power via the power supply base;
  if the roaming equipment is not receiving the external supply of power, configuring the communication means in the first mode;
  if the roaming equipment is receiving the external supply of power, configuring the communication means in the second mode.

* * * * *